United States Patent [19]

Schrader et al.

[11] 3,856,949

[45] Dec. 24, 1974

[54] N-ISOPROPYL-O-ETHYL-O-ARYLPHOSPHORIC ACID ESTER AMIDES AS ARTHROPODICIDES AND NEMATOCIDES

[76] Inventors: Gerhard Schrader, Kohlfurter Strasse 75, Wuppertal-Cronenberg; Bernhard Homeyer, Farbenfabriken Bayer A6, Leverkusen, both of Germany

[22] Filed: Oct. 13, 1972

[21] Appl. No.: 297,522

Related U.S. Application Data

[62] Division of Ser. No. 47,137, June 17, 1970, Pat. No. 3,709,961.

[52] U.S. Cl.............................. 424/216, 260/949
[51] Int. Cl............................................. A01n 9/36
[58] Field of Search ............ 424/215, 216; 260/949

[56] References Cited
UNITED STATES PATENTS

| | | | |
|---|---|---|---|
| 2,916,509 | 12/1959 | Schegk et al. | 260/949 |
| 3,042,703 | 7/1962 | Schegk et al. | 260/949 |
| 3,092,544 | 6/1963 | Naul et al. | 260/949 |
| 3,709,961 | 1/1973 | Schrader et al. | 424/216 |

*Primary Examiner*—Vincent D. Turner
*Attorney, Agent, or Firm*—Burgess, Dinklage & Sprung

[57] ABSTRACT

N-isopropyl-O-ethyl-O-arylphosphoric acid ester amides, i.e., N-isopropyl-O-ethyl-(3-methyl-4 methyl sulfonyl- and sulfoxyl-phenyl)-phosphoric acid ester amides which possess nematocidal, arthropodicidal, especially acaricidal and insecticidal, properties and which may be produced by conventional methods.

6 Claims, No Drawings

N-ISOPROPYL-O-ETHYL-O-ARYLPHOSPHORIC ACID ESTER AMIDES AS ARTHROPODICIDES AND NEMATOCIDES

This is a division of application Ser. No. 47,137 filed June 17, 1970 now U.S. Pat. No. 3,709,961 issued Jan. 9, 1973.

The present invention relates to and has for its objects the provision of particular new N-isopropyl-O-ethyl-O-arylphosphoric acid ester amides, i.e. N-isopropyl-O-ethyl-O-(3-methyl-4 methyl sulfonyl- and sulfoxyl-phenyl)-phosphoric acid ester amides, which possess nematocidal, arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. nematodes and arthropods with other and further objects becoming apparent from a study of the within specification and accompanying examples.

It is known that O-alkyl-O-phenylphosphoric acid ester amides, for example O-isopropyl-O-(3-methyl-4-methylmercaptophenyl)-phosphoric acid ester amide (A), O-methyl-O-(3-methyl-4-methymercaptophenyl)-N-methylthiophosphoric acid ester amide (B) and N,N-dimethyl-O-methyl-O-(3-methyl-4-mercaptomethylphenyl)-thiophosphoric acid ester amide (C) are effective as contact and systemic insecticides. On the other hand, O,O-dialkyl-O-arylthionophosphoric acid esters, such as O,O-diethyl-O-(2,4-dichlorophenyl)-thiophosphoric acid ester (D), exhibit a good nematocidal activity [cf. DAS(German Published Specification) 1,121,882 and U.S. Pat. No. 2,761,806].

It has now been found, in accordance with the present invention, that the particular new N-isopropyl-O-ethyl-O-phenylphosphoric acid ester amides of the formula

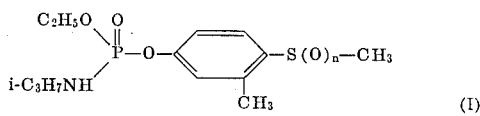

in which n is 1 or 2 exhibit strong nematocidal, in particular soil-nematocidal, and arthropodicidal, especially insecticidal and acaricidal properties.

The invention also provides a process for the production of a N-isopropyl-O-ethyl-O-phenylphosphoric acid ester amide of the formula (I) in which a N-isopropyl-O-ethylphosphoric acid ester amide halide of the formula

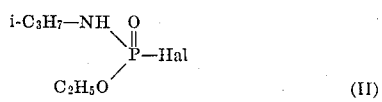

is reacted, in the presence of an acid-binding agent, with a 3-methyl-4-methylsulfoxyl- or -4-methylsulfonyl-phenol of the formula

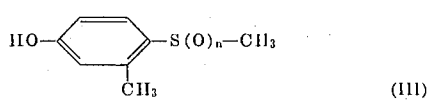

In the above formulae, $n$ is the same as defined above, while Hal stands for halogen, preferably chlorine or bromine.

Surprisingly, the N-isopropyl-O-ethyl-O-phenylphosphoric acid ester amides of the invention are distinguished by a considerably higher nematocidal activity then the known O,O-dialkyl-O-(2,4-dichlorophenyl)-thionophosphoric acid esters of analogous constitution and the same direction of activity. The compounds according to the present invention therefore represent a valuable contribution to the art.

If N-isopropyl-O-ethylphosphoric acid ester amide chloride and 3-methyl-4-methylsulfonylphenol are used as starting materials, the reaction course can be represented by the following formula scheme:

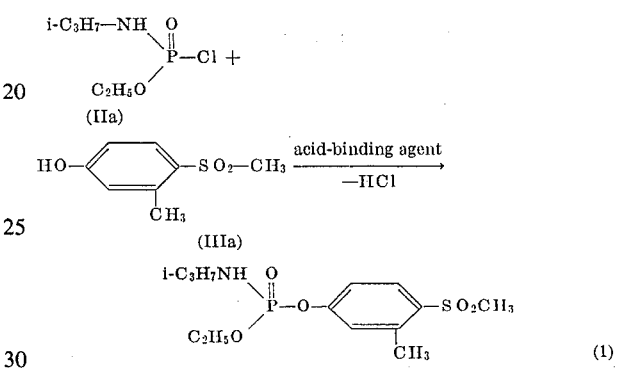

The starting materials to be used according to the process are clearly defined generally by the formulae (II) and (III) above. The phosphoric acid ester amide halides of formula (II) above are known from the literature and are readily accessible, even on an industrial scale, according to customary methods, while 3-methyl-4-methylsulfoxyl- or sulfonyl-phenol (III) can be prepared by oxidation with hydrogen peroxide under suitable reaction conditions.

The preparative process is preferably carried out in the presence of a solvent (this term includes a mere diluent). As such, all inert organic solvents are suitable. Preferred examples include aliphatic and aromatic (possibly chlorinated) hydrocarbons, such as benzine, benzene, toluene, xylene and chlorobenzene; ethers, such as diethyl ether, dibutyl ether and dioxan; ketones and nitriles, such as acetone, methylethyl ketone, methylisopropyl ketone, methylisobutyl ketone, acetonitrile and propionitrile.

The reaction temperatures can be varied within a fairly wide range. In general, the reaction is carried out at substantially between about 20° to 120° C, preferably at between about 50° to 90° C.

The reaction is, in general, carried out under normal pressure and, as already mentioned, in the presence of an acid acceptor. As such, all customary acid-binding agents are suitable. Particularly suitable have proved to be alkali metal carbonates and alcoholates, such as sodium and potassium carbonate or methylate and ethylate; further, aliphatic, aromatic and heterocyclic amines, for example triethylamine, dimethylaniline, dimethylbenzylamine and pyridine, and the like.

When the process is being carried out, the reactants may be reacted in equimolar proportion in one of the above-mentioned solvents in the presence of the acid acceptor at the stated temperatures. After the reactants have been combined, the mixture is stirred for a further 2 to 4 hours, then poured into water, extracted with an inert hydrocarbon, preferably benzene, the organic phase is separated and dried and the solvent is distilled off.

The compounds according to the invention are, as already mentioned above, distinguished by outstanding nematocidal properties with only slight toxicity to warm-blooded animals. They may therefore be used for the control of nematodes, particularly those of a phytopathogenic nature.

These include, in the main, leaf nematodes (Aphenlenchoides), such as the chrysanthemum foliar nematode (*A. ritzemabosi*, the strawberry nematode (*A. fragariae*), rice nematode (*A. oryzae*), and the like; stem nematodes (*Ditylenchus*), e.g. the stem nematode (*D. dipsaci*), and the like; root gall nematodes (Meloidogyne), such as *M. arenaria*, *M. incognita*, and the like; cyst-forming nematodes (Heterodera), for example the golden nematode of potato (*H. rostochiensis*), the sugar beet nematode (*H. schachtii*), and the like; the free-living root nematodes, e.g. of the genera Pratylenchus, Paratylenchus, Rotylenchus, Xiphinema and Radopholus; and the like.

In addition, the new compounds of the invention have outstanding insecticidal, acaricidal and systemic properties, with only slight phytotoxicicy.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite water liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, acaricides, insecticides, fungicides, and the like, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume with good success, i.e., by applying such compound if normally a liquid, or by applying a liquid composition containing the same, via very effective atomizing equipment, in finely divided form, e.g. average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. nematodes, arthropods, i.e., insects and acarids, and more particularly, methods of combating at least one of nematodes, insects and acarids, which comprise applying to at least one of correspondingly (a) such nematodes, (b) such insects, (c) such acarids, and (d) the corresponding habitat thereof, i.e., the locus to be protected, a correspondingly combative or toxic amount, i.e., a nematocidally, arthopodically, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be appreciated by the artisan that when using the instant active compounds against nematodes, such active compounds are preferably uniformly scattered in applied amounts of 5–50 kg of active compound per hectare and then worked into the soil.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Critical concentration test
Test nematode: *Meloidogyne incognita*
Solvent: 3 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto and the resulting concentrate is diluted with water to the desired final concentration.

The preparation of the given active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The particular active compounds tested, the amounts applied and the results obtained can be seen from the following Table 1.

TABLE 1

| Active compound (constitution) | | Concentration of active compound in p.p.m. | Degree of destruction in percent |
|---|---|---|---|
| $\begin{array}{c}C_2H_5O\\ \diagdown \\ i\text{-}C_3H_7\text{-}NH\end{array}\!\!\!\overset{O}{\underset{\phantom{|}}{\overset{\|}{P}}}\!\!-O-\!\!\bigcirc\!\!-SO\text{-}CH_3\;(CH_3)$ | (2) | 2.5<br>1.25<br>0.625 | 100<br>80<br>0 |
| $\begin{array}{c}C_2H_5O\\ \diagdown \\ i\text{-}C_3H_7\text{-}NH\end{array}\!\!\!\overset{O}{\underset{\phantom{|}}{\overset{\|}{P}}}\!\!-O-\!\!\bigcirc\!\!-SO_2\text{-}CH_3\;(CH_3)$ | (1) | 5<br>2.5<br>1.25<br>0.625 | 100<br>85<br>30<br>0 |
| $\begin{array}{c}i\text{-}C_3H_7O\\ \diagdown \\ NH_2\end{array}\!\!\!\overset{O}{\underset{\phantom{|}}{\overset{\|}{P}}}\!\!-O-\!\!\bigcirc\!\!-SCH_3\;(CH_3)$ (Known) | (A) | 100<br>50<br>25 | 100<br>98<br>50 |
| $\begin{array}{c}CH_3O\\ \diagdown \\ CH_3NH\end{array}\!\!\!\overset{S}{\underset{\phantom{|}}{\overset{\|}{P}}}\!\!-O-\!\!\bigcirc\!\!-SCH_3\;(CH_3)$ (Known) | (B) | 100<br>50<br>25 | 100<br>95<br>50 |
| $\begin{array}{c}CH_3O\\ \diagdown \\ (CH_3)_2N\end{array}\!\!\!\overset{S}{\underset{\phantom{|}}{\overset{\|}{P}}}\!\!-O-\!\!\bigcirc\!\!-SCH_3\;(CH_3)$ (Known) | (C) | 300<br>100<br>50 | 100<br>20<br>0 |
| $\begin{array}{c}C_2H_5O\\ \diagdown \\ C_2H_5O\end{array}\!\!\!\overset{S}{\underset{\phantom{|}}{\overset{\|}{P}}}\!\!-O-\!\!\bigcirc\!\!-Cl\;(Cl)$ (Known) | (D) | 40<br>20<br>10<br>5 | 98<br>80<br>50<br>0 |

EXAMPLE 2

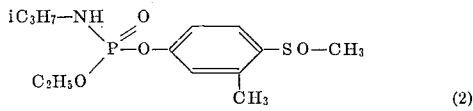

$$(2)$$

75 g potassium carbonate and 93 g N-isopropyl-O-ethyl-phosphoric acid amide chloride are added to 85 g 3-methyl-4-methylsulfoxylphenol in 500 ml acetonitrile. After 3 hours stirring at 60° C, the mixture is poured into water and extracted with benzene, and the benzene phase is separated and evaporated. The yield of N-isopropyl-O-ethyl-O-(3-methyl-4-methylsulfoxylphenyl)-phosphoric acid ester amide is 100 g (63% of the theory). The refractive index is $n_D^{19} = 1.5274$.

EXAMPLE 3

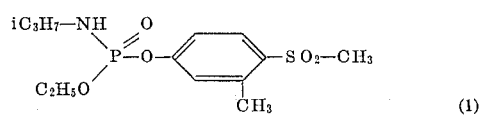

$$(1)$$

75 g potassium carbonate and 93 g N-isopropyl-O-ethyl-phosphoric acid ester amide chloride are added to 93 g 3-methyl-4-methylsulfonylphenol in 500 ml acetonitrile. The mixture is then heated to 60° to 70° C for 3 hours, poured into water and extracted with benzene, and the benzene phase is separated, dried and evaporated. The yield is 140g. The N-isopropyl-O-ethyl-O-(3-methyl-4-methylsulfonylphenyl)-phosphoric acid ester amide melts at 77° C.

The 3-methyl-4-methylsulfoxyl- or sulfonyl-phenols required as starting materials can be obtained for example as follows:

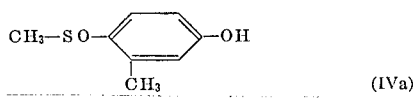  (IVa)

300 ml of 35% strength hydrogen peroxide are added, at 20° to 40° C, to 462 g 3-methyl-4-methylmercaptophenol dissolved in 1.2 l of methanol and 15 ml of sulfuric acid. The mixture is subsequently heated to 60° C for half an hour, and the sulfuric acid is neutralized with calcium carbonate then the mixture is filtered, the solvent is drawn off from the filtrate, and the residue is recrystallized. The yield is 380 g. The product melts at 123° C.

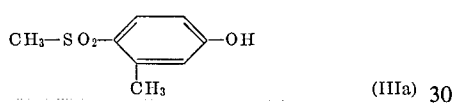  (IIIa)

A solution of 200 ml of 35%-strength hydrogen peroxide in 200 ml glacial acetic acid is added, at 50° to 90° C, to 155 g 3-methyl-4-methylmercaptophenol in 400 ml glacial acetic acid. The mixture is subsequently heated to 90° C for 2 hours, the solvent is then drawn off and the residue is triturated with petroleum ether. The yield is 140 to 145 g. The melting point of the product is 107° C.

More specifically, it will be realized that all of the foregoing compounds contemplated by the present invention possess the desired selective pesticidal, especially nematocidal, arthropodicidal, i.e., insecticidal or acaricidal, properties for combating nematodes, insects and acarids, and that such compounds have not only a very slight toxicity toward warm-blooded creatures, but also a concomitantly low phytotoxicity.

As may be used herein, the terms "anthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A nematocidal, acaricidal or insecticidal composition comprising a nematocidally, acaricidally or insecticidally effective amount of an N-isopropyl-O-ethyl-O-phenylphosphoric acid ester amide of the formula

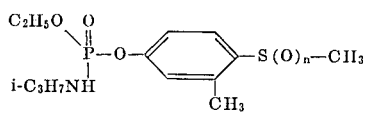

in which
n is 1 or 2,
in admixture with a diluent.

2. The composition of claim 1 wherein said ester amide is N-isopropyl-O-ethyl-O-(3-methyl-4-methylsulfoxyphenyl)-phosphoric acid ester amide of the formula

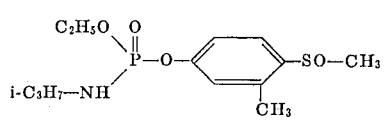

3. The composition of claim 1 wherein said ester amide is N-isopropyl-O-ethyl-O-(3-methyl-4-methylsulfonylphenyl)-phosphoric acid ester amide of the formula

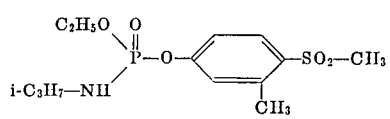

4. A method of combating nematodes, acarids or insects which comprises applying to such nematodes, acarids or insects or a habitat thereof a nematocidally, acaricidally or insecticidally effective amount of an N-isopropyl-O-ethyl-O-phenylphosphoric acid ester amide of the formula

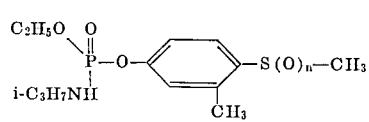

in which
n is 1 or 2.

5. The method of claim 4 wherein said ester amide is N-isopropyl-O-ethyl-O-(3-methyl-4-methylsulfoxyphenyl)-phosphoric acid ester amide of the formula

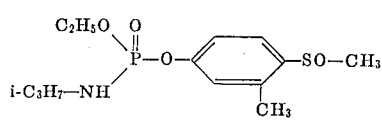

6. The method of claim 4 wherein said ester amide is N-isopropyl-O-ethyl-O-(3-methyl-4-methylsulfonylphenyl)-phosphoric acid ester amide of the formula

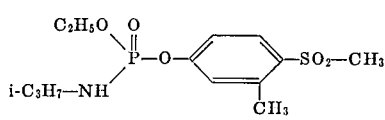

* * * * *